(12) United States Patent
Kidd et al.

(10) Patent No.: US 12,423,532 B2
(45) Date of Patent: Sep. 23, 2025

(54) DATA CENTER LABELING SYSTEM

(71) Applicant: Dell Products L.P., Round Rock, TX (US)

(72) Inventors: Owen O. Kidd, Cedar Park, TX (US); Nitin Goyal, Chandler, AZ (US); Trevor Cockrell, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/536,836

(22) Filed: Dec. 12, 2023

(65) Prior Publication Data

US 2025/0190722 A1    Jun. 12, 2025

(51) Int. Cl.
*G06K 1/12* (2006.01)

(52) U.S. Cl.
CPC .................... *G06K 1/121* (2013.01)

(58) Field of Classification Search
CPC ........................................ G06K 1/121
USPC .......................................................... 235/492
See application file for complete search history.

(56) References Cited

U.S. PATENT DOCUMENTS

| | | | |
|---|---|---|---|
| 2012/0211567 A1* | 8/2012 | Herzig | G06F 17/00 235/488 |
| 2015/0069119 A1* | 3/2015 | Hastman | G06Q 10/087 235/385 |
| 2020/0167781 A1* | 5/2020 | Osborn | G06V 30/40 |

* cited by examiner

*Primary Examiner* — Daniel A Hess
(74) *Attorney, Agent, or Firm* — Terrile, Cannatti & Chambers, LLP; Stephen A. Terrile

(57) ABSTRACT

A label management system. The label management system includes a label management application executing on a user device; and, a label device, the label device comprising a machine readable code portion; and, a lenticular lens portion, the lenticular lens portion being designed so that when viewed from different angles by the user device, different parts of the machine readable code portion are accessed by the user device.

18 Claims, 7 Drawing Sheets

DATA CENTER LABELING SYSTEM

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for providing a data center labeling system.

In one embodiment, the invention relates to a label device for use with a server type information handling system, comprising: a machine readable code portion; and, a lenticular lens portion, the lenticular lens portion being designed so that when viewed from different angles, different parts of the machine readable code portion are shown.

In another embodiment, the invention relates to a label management system comprising: a label management application executing on a user device; and, a label device, the label device comprising a machine readable code portion; and, a lenticular lens portion, the lenticular lens portion being designed so that when viewed from different angles, different parts of the machine readable code portion are shown.

In another embodiment, the invention relates to a system comprising: a chassis; a processor contained within the chassis; a data bus coupled to the processor; a label device affixed to the chassis, the label device comprising a machine readable code portion; and, a lenticular lens portion, the lenticular lens portion being designed so that when viewed from different angles, different parts of the machine readable code portion are shown.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
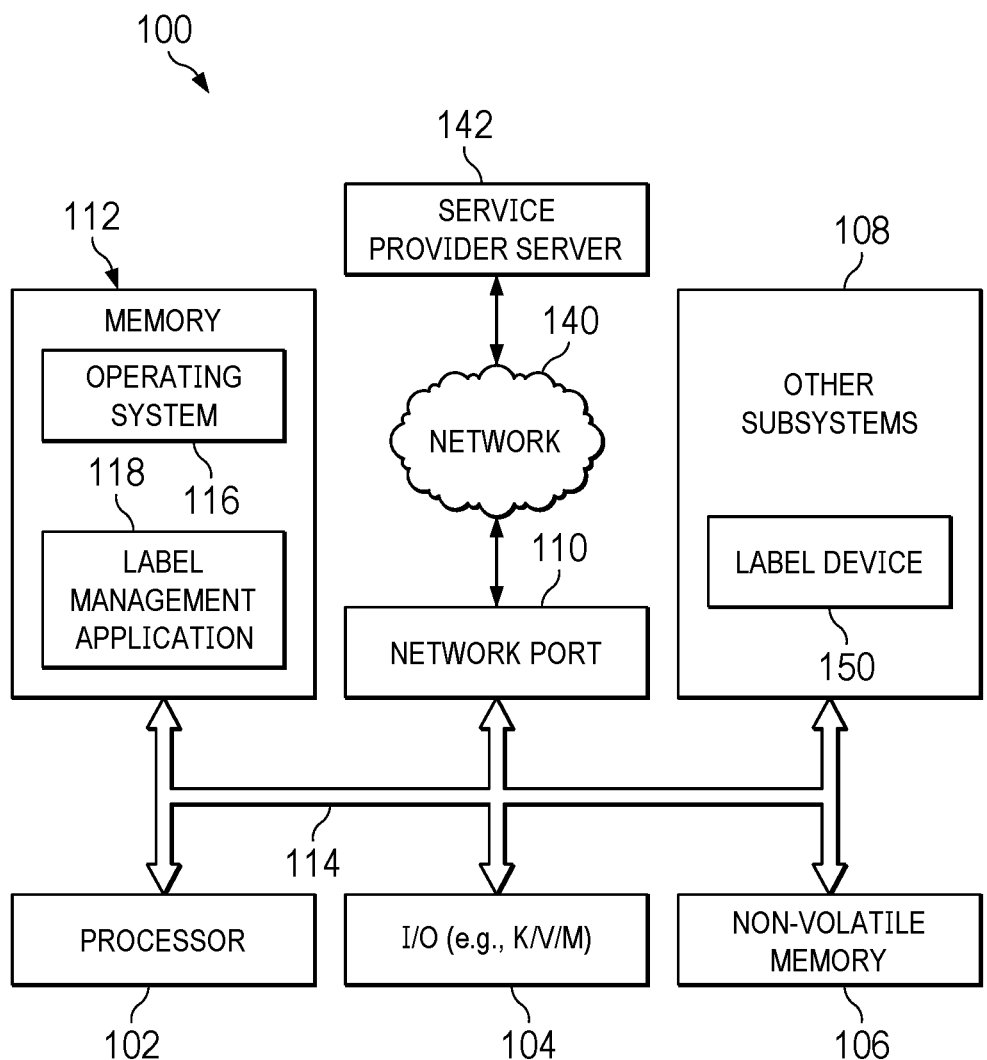
FIG. 1 shows a general illustration of components of an information handling system as implemented in the system and method of the present invention.

Various aspects of the disclosure include an appreciation that information handling systems, especially server type information handling systems, are consistently being challenged to perform more functions in less space. Various aspects of the disclosure include an appreciation that compact or complex server type information handling systems often have less available faceplate space for overly verbose labelling surfaces that can still meet human readable labelling requirements. These platforms often provide automation assistance by enumerating vital system information into quick response (QR), or other machine-readable codes, with accompanying human readable text. However, providing information in both human readable and machine readable forms can consume a considerable amount of space on the faceplate.

A system and method are disclosed for providing a data center labeling system which includes a lenticularly lensed machine-readable label device. Such a data center labeling system saves space by allowing multiple machine-readable codes to exist within the same footprint, thus leaving extra space for the human readable text. In certain embodiments, the lenticularly lensed machine-readable code label device can also provide additional avenues for sequential read of machine-readable codes to form larger, more complex datasets unburdened by a need for network connectivity.

In certain embodiments, the data center labeling system integrates a plurality of machine-readable codes into a single label device using a lenticular print. The user can still directly read human-readable text printed elsewhere on the labelling surface without changing their view angle, while pivoting their scanner to achieve machine readability of machine-readable codes contained within the lenticular print. With the data center labeling system, no two machine-readable codes are visible at the same time. In certain embodiments, the information label contains an indicator of which scan angle provides the appropriate machine readable information. In certain embodiments, the data center labeling system performs a label management operation for sequentially reading lenticularly-lensed machine readable codes. Such a data center labeling system saves space by allowing multiple machine-readable codes to exist within the same footprint, thus allowing additional room to be utilized for human-readable print.

In certain embodiments, the label management operation reads the machine readable codes sequentially and assembles the sequenced codes into usable data. In certain embodiments, the label management operation supports identification or mitigation of out-of-sequence reads to prevent reading of invalid, corrupt, or garbled data. In certain embodiments, the data center labeling system includes label devices which associate data (such as a header) with each payload thereby indicating where the data lies in the sequence of data reads. In certain embodiments, the data center labeling system combines the same machine readable code sequence multiple times in a singular lenticular image (such as 1-2-3-1-2-3). Such a combination would allow a user starting at sequence #2 to continue reading from 2-3-1, which would then be formatted properly as 1-2-3, returning the expected data payload.

Such a label device enables provision of multiple label aspects in the same footprint. In certain embodiments, the label device aids manufacturing and automation through prevention of erroneous scans where two side-by-side machine-readable codes may be mis-scanned or scanned at the same time. In certain embodiments, the lenticularly printed machine-readable codes are textured and provide generally thicker prints, when compared with standard machine readable codes, which makes it more difficult for malicious actors to stick subversive alternate codes on top without detection.

In certain embodiments, the data center labeling system uses sequential reads of lenticularly printed machine readable codes in combination to provide larger datasets of information. In certain embodiments, the data center labeling system provides increased data storage capability in the same or similar physical footprint. In certain embodiments, the label management operation translates the larger datasets of information to be user readable. Such a label system advantageously improves access to system information in the datacenter where devices in data halls may not be allowed to access network resources. In certain embodiments, by using the larger datasets of information, the label management operation provides an improved ability to disseminate additional, platform-related information on the platform itself.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. In various embodiments, one or both the other subsystems 108 or the network port 110 include a label device 150. The information handling system 100 likewise includes system memory 112, which is interconnected to the foregoing via one or more buses 114. System memory 112 further comprises operating system (OS) 116 and a label management application 118.

In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a blade server type information handling system. As used herein, a blade server type information handling system broadly refers to an information handling system which is physically configured to be mounted within a server rack.

In certain embodiments, the label management application 118 performs a label management operation. In certain embodiments, the label management application 118, the label device 150, or a combination thereof, provide a data center labeling system. In certain embodiments, the label device 150 includes a lenticularly lensed machine-readable label device. Such a data center labeling system saves space by allowing multiple machine-readable codes to exist within the same footprint, thus leaving extra space for the human readable text. In certain embodiments, the lenticularly lensed machine-readable code label device can also provide additional avenues for sequential read of machine-readable codes to form larger, more complex data-sets unburdened by a need for network connectivity.

In certain embodiments, the data center labeling system integrates a plurality of machine-readable codes into a single label device using a lenticular print. The user can still directly read human-readable text printed elsewhere on the labelling surface without changing their view angle, while pivoting their scanner to achieve machine readability of machine-readable codes contained within the lenticular print. With the data center labeling system, no two machine-readable codes are visible at the same time. In certain embodiments, the information label contains an indicator of which scan angle provides the appropriate machine readable information. In certain embodiments, the data center labeling system performs a label management operation for sequentially reading lenticularly-lensed machine readable codes. Such a data center labeling system saves space by allowing multiple machine-readable codes to exist within the same footprint, thus allowing additional room to be utilized for human-readable print.

In certain embodiments, the label management operation reads the machine readable codes sequentially and assembles the sequenced codes into usable data. In certain embodiments, the label management operation supports identification or mitigation of out-of-sequence reads to prevent reading of invalid, corrupt, or garbled data. In certain embodiments, the data center labeling system includes label devices which associate data (such as a header) with each payload thereby indicating where the data lies in the sequence of data reads. In certain embodiments, the data center labeling system combines the same machine readable code sequence multiple times in a singular lenticular image (such as 1-2-3-1-2-3). Such a combination would allow a user starting at sequence #2 to continue reading from 2-3-1, which would then be formatted properly as 1-2-3, returning the expected data payload.

Such a label device enables provision of multiple label aspects in the same footprint. In certain embodiments, the label device aids manufacturing and automation through prevention of erroneous scans where two side-by-side machine-readable codes may be mis-scanned or scanned at the same time. In certain embodiments, the lenticularly printed machine-readable codes are textured and provide generally thicker prints, when compared with standard machine readable codes, which makes it more difficult for malicious actors to stick subversive alternate codes on top without detection.

In certain embodiments, the data center labeling system uses sequential reads of lenticularly printed machine readable codes in combination to provide larger datasets of information. In certain embodiments, the data center labeling system provides increased data storage capability in the same or similar physical footprint. In certain embodiments, the label management operation translates the larger datasets of information to be user readable. Such a label system advantageously improves access to system information in the datacenter where devices in data halls may not be allowed to access network resources. In certain embodiments, by using the larger datasets of information, the label management operation provides an improved ability to disseminate additional, platform-related information on the platform itself.

Figure 2:
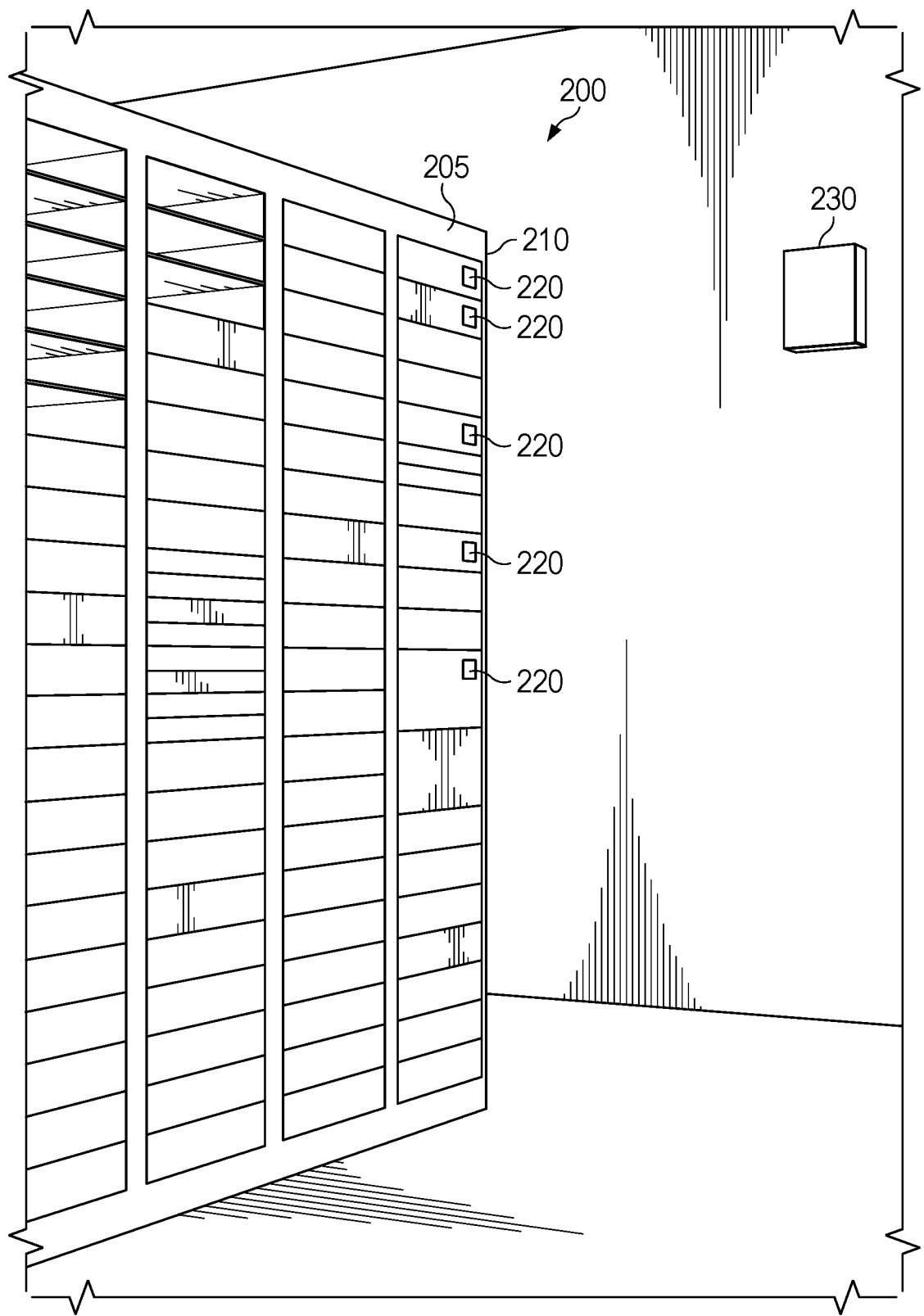
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100 as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel. As used herein, a data center broadly refers to a building, a dedicated space within a building, or a group of buildings, used to house a collection of interrelated data center assets implemented to work in combination with one another for a particular purpose. As likewise used herein, a data center asset broadly refers to anything that can be owned, controlled, or enabled to produce value as a result of its use within a data center. In certain embodiments, a data center asset may include a product, or a service, or a combination of the two. In certain embodiments, a data center asset includes an information handling system.

In certain embodiments, a plurality of racks is arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1 U rack unit, a 2 U rack unit and a 4 U rack unit. In general, a 1 U rack unit is substantially (i.e., +/−20%) 1.75" high, a 2 U rack unit is substantially (i.e., +/−20%) 3.5" high and a 4 U rack height is substantially (i.e., +/−20%) 7.0" high.

In certain embodiments, one or more of the vertically arranged information handling system 210 include respective label devices 220. In certain embodiments, each label device 210 includes a lenticularly lensed machine-readable label device. In certain embodiments, each label devices includes a lenticularly printed machine readable code portion. In certain embodiments, a user device 230 interacts with a respective label device to perform a label management operation.

Figure 3:
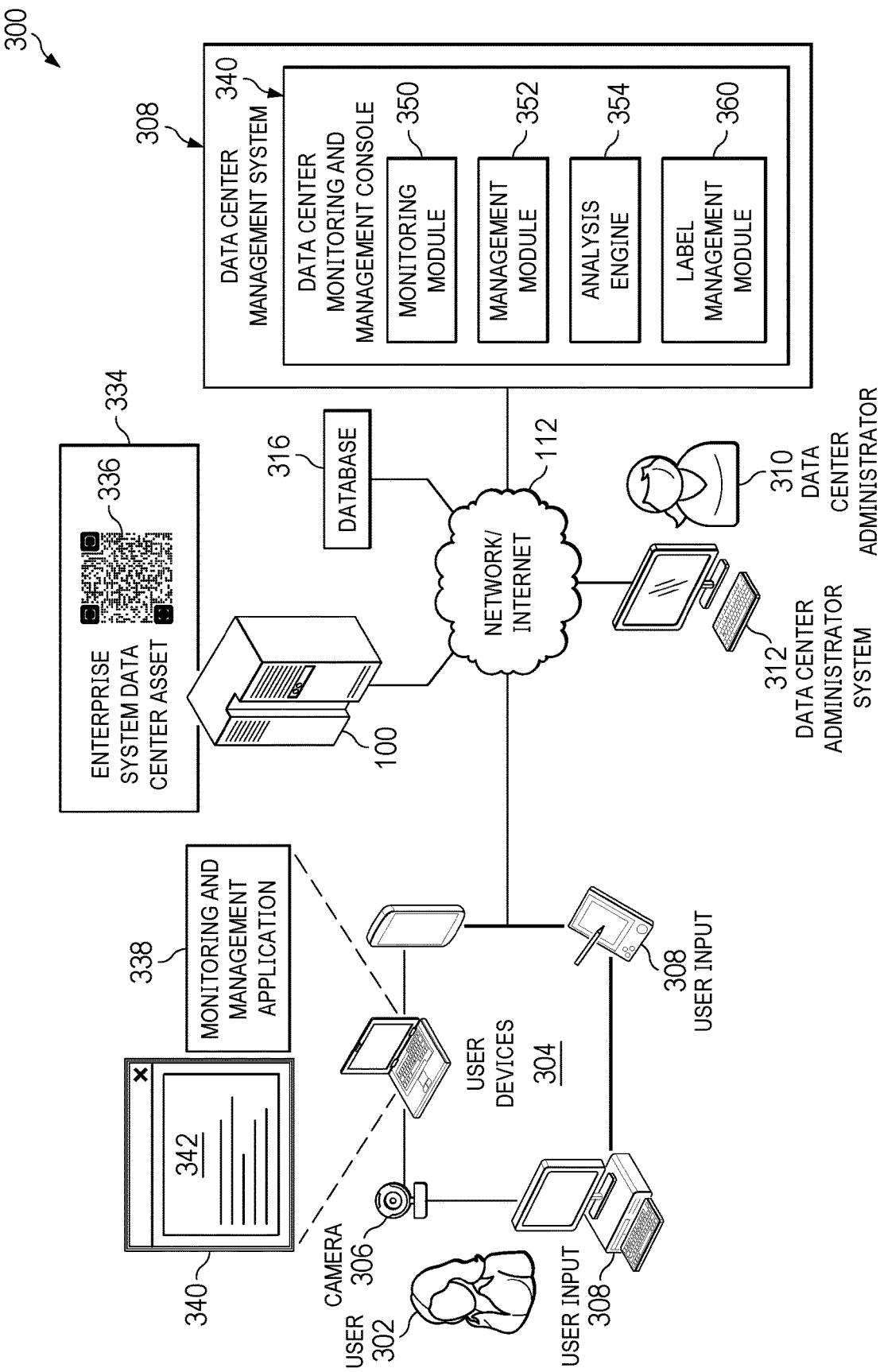
FIG. 3 shows an environment for data center asset label management in a data center.

FIG. 3 shows an environment 300 for data center asset label management in a data center. In various embodiments, the environment 300 includes one or more information handling system 100 described in FIG. 1. In certain embodiments, the information handling system 100 includes a label management application 118. In certain implementations, the information handling system 100 includes, or communicates with, a user device 304. In certain embodiments, a wireless connection (such as a Radio Frequency (RF) connection) is maintained between the information handling system 100 and the user device 304. As used herein, a user device 304 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 302.

In certain embodiments, a data center monitoring and management application 338 may be implemented on a particular user device 304. In certain embodiments, the data center monitoring and management application 338 includes a label management application such as label management application 118. In various embodiments, the data center monitoring and management application 338 may be implemented on a mobile user device 304, such as a laptop computer, a tablet computer, a smart phone, a dedicated-purpose mobile device, and so forth. In certain of these embodiments, the mobile user device 304 may be used at various locations within the data center monitoring and management environment 300 by the user 302 when performing a data center monitoring and management operation, described in greater detail herein.

In certain embodiments, the information handling system 100 connects with a data center management system 308 through the network 112. The data center management system 308 can be a cloud hosted machine or a user deployed enterprise solution. The data center management system 308 can have information and data as to hardware and configuration of data centers and is used to manage configuration and inventory of data centers. In certain embodiments, a data center administrator 310, through a data center administrator system 312, interacts with the data center management system 308. In certain embodiments, one or both the information handling system 100 and the data center management system 308 connect with a label database 316 via the network 112. In certain embodiments, the user device 304 may also communicate directly with the label database 316.

The camera 306 is configured to capture images of a data center asset label device 336. In certain implementations, a user 330 can identify particular data center assets 334 of a data center based upon the captured images as well as information stored within the database 316.

In certain embodiments, a user device 304 may be implemented with a camera 306, such as a video camera known to skilled practitioners of the art. In certain embodiments, the camera 306 may be integrated into the user device 304. In certain embodiments, the camera 306 may be implemented as a separate device configured to interoperate with the user device 304. As an example, a webcam familiar to those of skill in the art may be implemented to receive and communicate various image and audio signals to a user device 304 via a Universal Serial Bus (USB) interface. In certain embodiments, the user device 304 may be configured to present a data center monitoring and management console user interface (UI) 340. In certain embodiments, the data center monitoring and management console UI 340 may be implemented to present a graphical representation 342 of data center asset monitoring and management information, which is automatically generated in response to interaction with the data center monitoring and management console 118.

In certain embodiments, a data center monitoring and management application 338 may be implemented on a particular user device 304. In various embodiments, the data center monitoring and management application 338 may be implemented on a mobile user device 304, such as a laptop computer, a tablet computer, a smart phone, a dedicated-purpose mobile device, and so forth. In certain of these embodiments, the mobile user device 304 may be used at various locations within the data center monitoring and management environment 300 by the user 302 when performing a data center monitoring and management operation, described in greater detail herein.

In certain embodiments, the data center monitoring and management environment 300 may include a data center monitoring and management console 340. In certain embodiments, the data center monitoring and management console 340 may be implemented to perform a data center monitoring and management operation. As used herein, a data center monitoring and management operation broadly refers to any task, function, procedure, or process performed, directly or indirectly, within a data center monitoring and management environment 300 to procure, deploy, configure, implement, operate, monitor, manage, maintain, or remediate a data center asset 334. In certain embodiments, a data center monitoring and management operation can include a label management operation. As used herein, a label management operation refers to any task, function, procedure, or process performed, directly or indirectly, within a data center monitoring and management environment 300 to interact with a label device 336 associated with a particular data center asset 334. In various embodiments, the interaction incudes obtaining information from the label device using a plurality of different viewing angles.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244.

In certain embodiments, the data center monitoring and management console 340 may be implemented to include a monitoring module 350, a management monitor 352, an analysis engine 354, and a label management module 356, or a combination thereof. In certain embodiments, the monitoring module 350 may be implemented to monitor the procurement, deployment, implementation, operation, management, maintenance, or remediation of a particular data center asset 334 at any point in its lifecycle. In certain embodiments, the management module 352 may be implemented to manage the procurement, deployment, implementation, operation, monitoring, maintenance, or remediation of a particular data center asset 334 at any point in its lifecycle. In certain embodiments, the analysis engine 354 may be implemented to analyze information associated with the procurement, deployment, implementation, operation, monitoring, maintenance, or remediation of a particular data center asset 334 at any point in its lifecycle. In certain embodiments, the label management module 356 may be implemented to perform some or all of a label management operation. In various embodiments, the monitoring module 120, the management module 122, the analysis engine 124, and the label management module 360, may be implemented, individually or in combination with one another, to perform a data center asset monitoring and management operation, as likewise described in greater detail herein.

In certain embodiments, a label management application, a label device, a label management module, or a combination thereof provide a label management system. In certain embodiments, a data center asset, a label management application, a label device, a label management module, or a combination thereof provide a data center asset label management system. In certain embodiments, a plurality of data center assets, a label management application, a plurality of label devices, a label management module, or a combination thereof provide a data center label management system.

Figure 4:
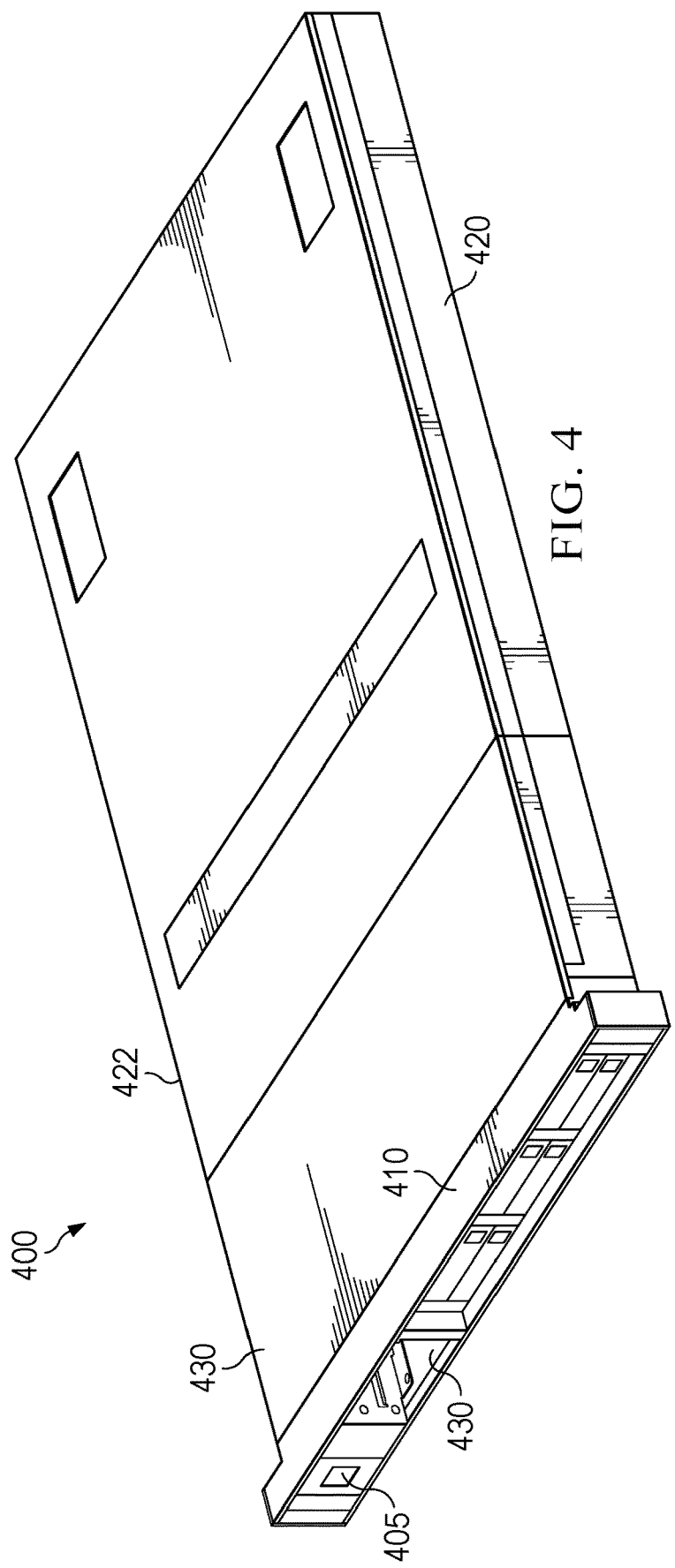
FIG. 4 shows a generalized perspective view of an example server type information handling system.

FIG. 4 shows a generalized perspective view of an example blade server type information handling system 400 which includes an associated label device 405. In certain embodiments, the server type information handling system includes a front portion 410, which is accessible when the server type information handing system 400 is mounted on a server rack. In certain embodiments, the label device 405 is mounted on the front portion 410 of the information handling system 400. In certain embodiments, the label device 405 includes a lenticularly lensed machine-readable label device. In certain embodiments, the label device 405 includes a lenticularly printed machine readable code portion. In certain embodiments, a user device interacts with a respective label device to perform a label management operation.

In certain embodiments, the side portions 420, 422 mount to the rack via respective server mounting components. In certain embodiments, the side portions mount to the rack via respective mechanical guiding features which are mechanically coupled to respective server mounting components. In certain embodiments, the server type information handling system can slide out from the rack via the respective mechanical guiding features. In certain embodiments, internal components of the blade type information handling system 400 may be accessed by removing a top panel 430 of the blade type information handing system 400. In certain embodiments, the blade type information handing system 400 includes a bay 450 via which components may be mounted to the blade type information handling system.

Figure 5:
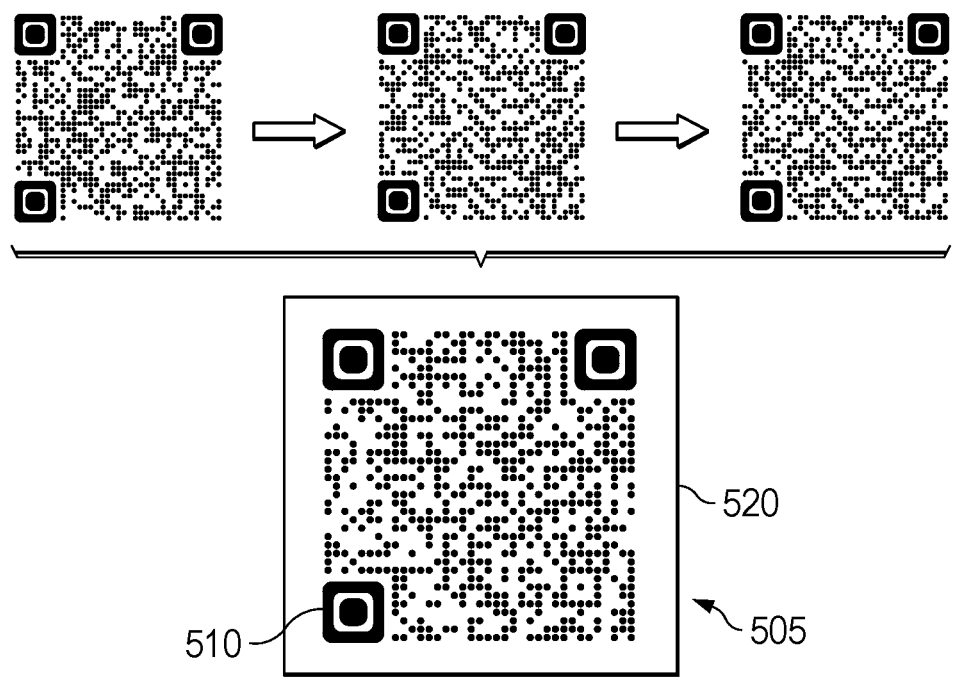
FIG. 5 shows a representation of a labeling device for use with a data center labeling system.

FIG. 5 shows a representation of a labeling device 505 for use with a data center labeling system. In certain embodiments, the label device 505 includes a machine readable code portion 510 and a lenticular lens portion 520. In certain embodiments, the label device 505 includes machine readable code portion 510. In certain embodiments, the machine readable code portion is lenticularly printed to interact with the lenticular lens portion 520.

In certain embodiments, the lenticular lens portion 520 includes a lenticular lens. In certain embodiments, a lenticular lens includes an array of lenses designed so that when viewed from different angles, different parts of the machine readable code portion are shown. In certain embodiments, lenticularly printing the machine readable code portion includes generating a lenticular image for each of a plurality of machine readable codes. By being so printed, the machine readable code portion provides a plurality of alternate machine readable codes. It will be appreciated that while the disclosed examples show three different viewing angles, any plurality of viewing angles may be provided by configuring the machine readable portion 510 and the lenticular lens portion 520 accordingly. For example, a label device 505 may be configured with two to six viewing angles. It will be appreciated that with more viewing angles, more machine readable codes can be provided in the same space. In various embodiments, some or all of the machine readable codes include respective pointers.

Figure 6A:
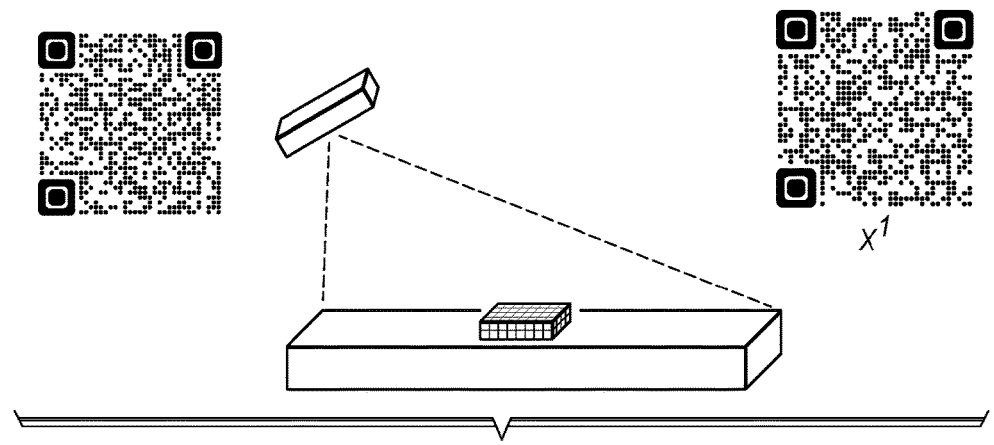
FIGS. 6A, 6B and 6C, generally referred to as FIG. 6, show an operational view of a label management operation.
Figure 6B:
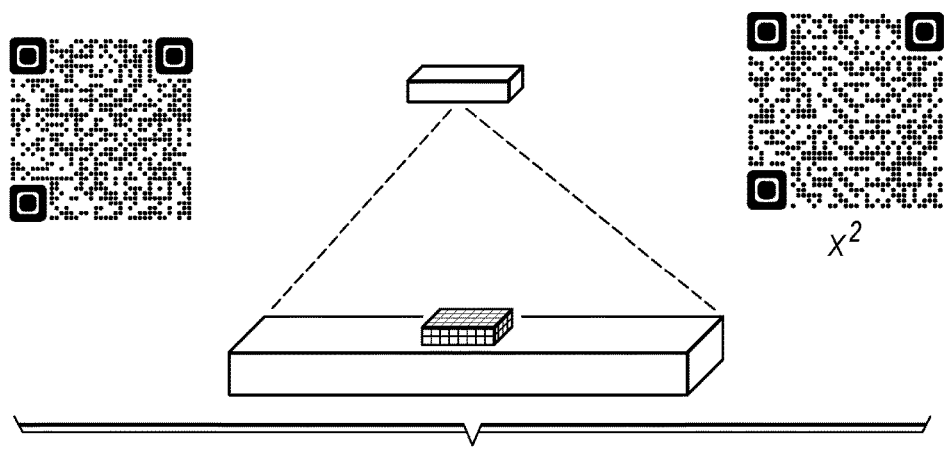
Figure 6C:
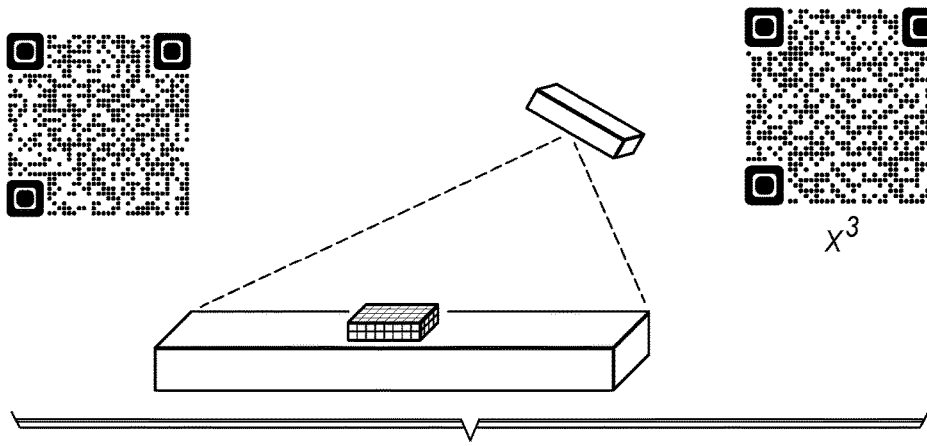

FIGS. 6A, 6B and 6C, generally referred to as FIG. 6, show an operational view of a label management operation. In certain embodiments, when performing the label management operation, the data center labeling system uses sequential reads of lenticularly printed machine readable codes to provide a set of machine readable codes. For example, the first angle of the read might provide a dataset $X^1$, the second angle of the read might provide a dataset $X^2$ and the third angle of the read might provide a dataset $X^3$. Accordingly, the set of machine readable codes obtained from the sequential reads can produce a set of machine readable codes $X^1$, $X^2$, $X^3$. In certain embodiments, each dataset includes a unique pointer. In certain embodiments, each unique pointer points to a respective universal resource locater (URL). It will be appreciated that while the disclosed examples show three different viewing angles, any plurality of viewing angles may be provided by configuring the machine readable portion and the lenticular lens portion accordingly. For example, a label device may be configured with two to six viewing angles. It will be appreciated that with more viewing angles, more machine readable codes can be provided in the same space.

In certain embodiments, the data center labeling system integrates a plurality of machine-readable codes into a single label device using a lenticular print. The user can still directly read human-readable text printed elsewhere on the labelling surface without changing their view angle, while pivoting their scanner (e.g., a camera on a user device) to achieve machine readability of a plurality of machine-readable codes contained within the lenticular print. With the data center labeling system, no two machine-readable codes are visible at the same time. In certain embodiments, the information label contains an indicator of which scan angle provides the appropriate machine readable information.

In certain embodiments, the data center labeling system performs a label management operation for sequentially reading the plurality of lenticularly-lensed machine readable codes. Such a data center labeling system saves space by allowing multiple machine-readable codes to exist within the same footprint, thus allowing additional room to be utilized for human-readable print. In certain embodiments, the label management operation reads the machine readable codes sequentially and assembles the sequenced codes into a set of machine readable codes. In certain embodiments, the label management operation supports identification or mitigation of out-of-sequence reads to prevent reading of invalid, corrupt, or garbled data. In certain embodiments, the data center labeling system includes label devices which associate data (such as a header) with each payload thereby indicating where the data lies in the sequence of data reads. In certain embodiments, the data center labeling system combines the same machine readable code sequence multiple times in a singular lenticular image (such as 1-2-3-1-2-3). Such a combination would allow a user starting at sequence #2 to continue reading from 2-3-1, which would then be formatted properly as 1-2-3, returning the expected data payload.

Figure 7A:
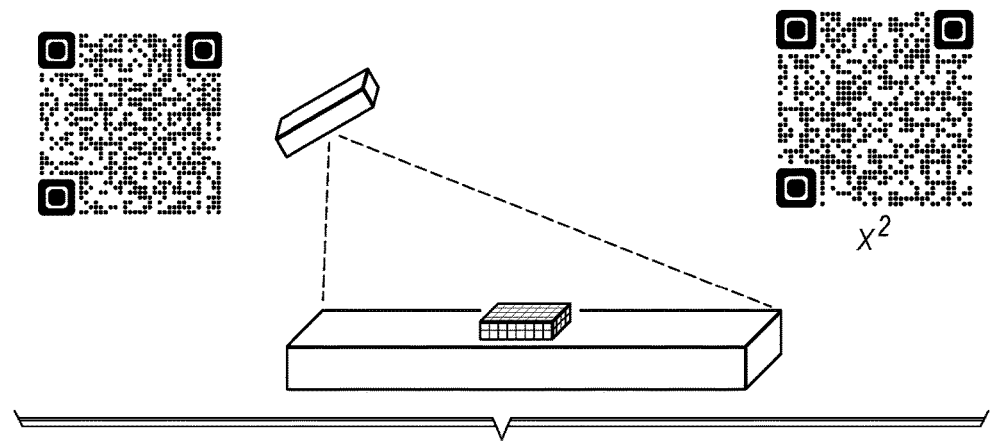
FIGS. 7A, 7B and 7C, generally referred to as FIG. 7, show an operational view of an alternate label management operation.
Figure 7B:
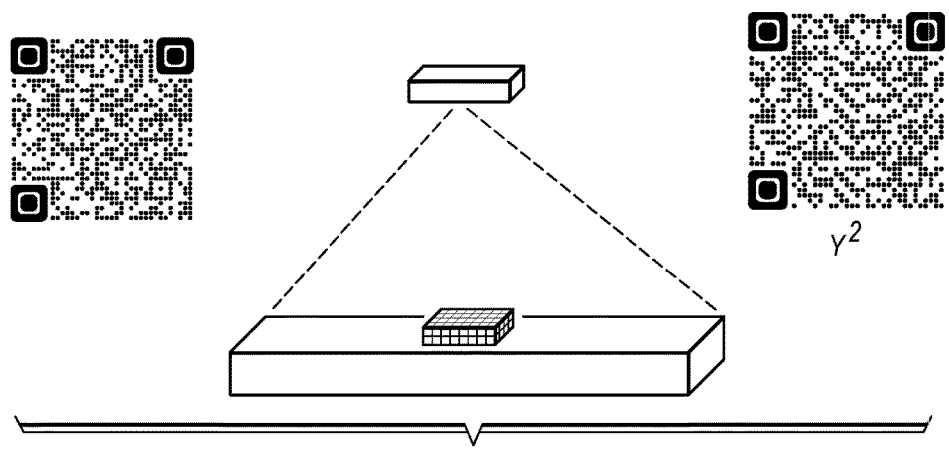
Figure 7C:
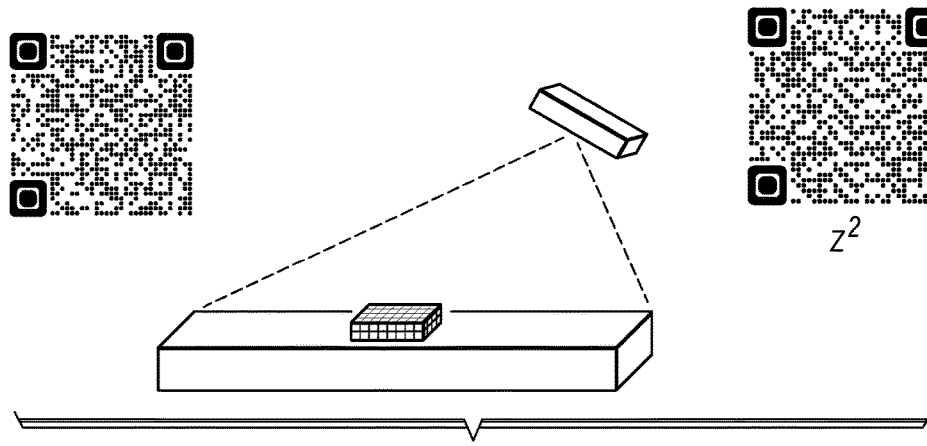

FIGS. 7A, 7B and 7C, generally referred to as FIG. 7, show an operational view of an alternate label management operation. In certain embodiments, when performing the alternate label management operation, the data center labeling system uses sequential reads of lenticularly printed machine readable codes in combination to provide larger datasets of information. For example, the first angle of the read might provide a dataset $X^2$, the second angle of the read might provide a dataset $Y^2$ and the third angle of the read might provide a dataset $Z^2$. Accordingly, the combination of the datasets obtained from the sequential reads can produce a dataset $X^2Y^2Z^2$. It will be appreciated that while the disclosed examples show three different viewing angles, any plurality of viewing angles may be provided by configuring the machine readable portion and the lenticular lens portion accordingly. For example, a label device may be configured with two to six viewing angles. It will be appreciated that with more viewing angles, larger datasets can be provided in the same space.

In certain embodiments, the data center labeling system provides increased data storage capability in the same or similar physical footprint. In certain embodiments, the label management operation translates the larger datasets of information to be user readable. Such a label system advantageously improves access to system information in the datacenter where devices in data halls may not be allowed to access network resources. In certain embodiments, by using the larger datasets of information, the label management operation provides an improved ability to disseminate additional, platform-related information on the platform itself.

In certain embodiments, the label management operation reads the machine readable codes sequentially and assembles the sequenced codes into the larger dataset. In certain embodiments, the label management operation supports identification or mitigation of out-of-sequence reads to prevent reading of invalid, corrupt, or garbled data. In certain embodiments, the data center labeling system includes label devices which associate data (such as a header) with each payload thereby indicating where the data lies in the sequence of data reads. In certain embodiments, the data center labeling system combines the same machine readable code sequence multiple times in a singular lenticular image (such as 1-2-3-1-2-3). Such a combination would allow a user starting at sequence #2 to continue reading from 2-3-1, which would then be formatted properly as 1-2-3, returning the expected data payload.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A label device for use with a server type information handling system, comprising:
   a machine readable code portion; and,
   a lenticular lens portion, the lenticular lens portion being designed so that when viewed from different angles, different parts of the machine readable code portion are shown, the different parts of the machine readable code portion providing a larger dataset of information regarding the server type information handling system, the different parts of the machine readable code portion being designed to be read sequentially, the larger dataset being assembled from the sequentially read different parts of the machine readable code; and wherein
   the different parts of the machine readable code portion are combined in a code sequence including multiple versions of the different parts of the machine readable code portion, the multiple versions of the different parts of the machine readable code portion allowing a properly formatted sequence of the different parts of the machine readable code portion even when the different parts of the machine readable code portion are read out of sequence;
   the label device is affixed to a chassis of the server type information handling system; and,
   the larger dataset of information regarding the server type information handling system disseminates server platform related information via the server type information handling system itself.

2. The label device of claim 1, wherein:
   the machine readable code portion is lenticularly printed to interact with the lenticular lens portion.

3. The label device of claim 2, wherein:
   lenticularly printing the machine readable code portion provides a plurality of alternate machine readable codes.

4. The label device of claim 3, wherein:
   the plurality of alternate machine readable codes provide a set of machine readable codes.

5. The label device of claim 3, wherein:
   the plurality of alternate machine readable codes provide the larger dataset of information when the plurality of alternate machine readable codes are read in sequence.

6. The label device of claim 1, wherein:
   the machine readable code portion comprises a quick response (QR) code.

7. A label management system comprising:
   a label management application executing on a user device; and,
   a label device for labeling a server type information handling system, the label device comprising
   a machine readable code portion; and,
   a lenticular lens portion, the lenticular lens portion being designed so that when viewed from different angles by the user device, different parts of the machine readable code portion are accessed by the user device, the different parts of the machine readable code portion providing a larger dataset of information regarding the server type information handling system the different parts of the machine readable code portion being designed to be read sequentially, the larger dataset being assembled from the sequentially read different parts of the machine readable code; and wherein
   the different parts of the machine readable code portion are combined in a code sequence including multiple versions of the different parts of the machine readable code portion, the multiple versions of the different parts of the machine readable code portion allowing a properly formatted sequence of the different parts of the machine readable code portion even when the different parts of the machine readable code portion are read out of sequence;
   the label device is affixed to a chassis of the server type information handling system; and,
   the larger dataset of information regarding the server type information handling system disseminates server platform related information via the server type information handling system itself.

8. The label management system of claim 7, wherein:
   the machine readable code portion is lenticularly printed to interact with the lenticular lens portion.

9. The label management system of claim 8, wherein:
   lenticularly printing the machine readable code portion provides a plurality of alternate machine readable codes.

10. The label management system of claim 9, wherein:
    the plurality of alternate machine readable codes provide a set of machine readable codes.

11. The label management system of claim 9, wherein:
    the plurality of alternate machine readable codes provide the larger dataset of information when the plurality of alternate machine readable codes are read in sequence.

12. The label management system of claim 7, wherein:
    the machine readable code portion comprises a quick response (QR) code.

13. A system comprising:
    a chassis for a server type information handling system;
    a processor contained within the chassis;
    a data bus coupled to the processor;
    a label device affixed to the chassis, the label device comprising a machine readable code portion; and,
    a lenticular lens portion, the lenticular lens portion being designed so that when viewed from different angles, different parts of the machine readable code portion are shown, the different parts of the machine readable code portion providing a larger dataset of information regarding the server type information handling system, the different parts of the machine readable code portion being designed to be read sequentially, the larger dataset being assembled from the sequentially read different parts of the machine readable code; and wherein
    the different parts of the machine readable code portion are combined in a code sequence including multiple versions of the different parts of the machine readable code portion, the multiple versions of the different parts of the machine readable code portion allowing a properly formatted sequence of the different parts of the machine readable code portion even when the different parts of the machine readable code portion are read out of sequence;
    the larger dataset of information regarding the server type information handling system disseminates server platform related information via the server type information handling system itself.

14. The system of claim 13, wherein:
the machine readable code portion is lenticularly printed to interact with the lenticular lens portion.

15. The system of claim 14, wherein:
lenticularly printing the machine readable code portion provides a plurality of alternate machine readable codes.

16. The system of claim 15, wherein:
the plurality of alternate machine readable codes provide a set of machine readable codes.

17. The system of claim 15, wherein:
the plurality of alternate machine readable codes provide the larger dataset of information when the plurality of alternate machine readable codes are read in sequence.

18. The system of claim 13, wherein:
the machine readable code portion comprises a quick response (QR) code.

\* \* \* \* \*